Aug. 11, 1931.  B. E. MINTURN  1,818,920
BRAKE
Filed May 7, 1929  2 Sheets-Sheet 1

Inventor:
Benjamin E. Minturn

Aug. 11, 1931.  B. E. MINTURN  1,818,920
BRAKE
Filed May 7, 1929   2 Sheets-Sheet 2

Inventor:
Benjamin E. Minturn

Patented Aug. 11, 1931

1,818,920

UNITED STATES PATENT OFFICE

BENJAMIN EARLE MINTURN, OF CHICAGO, ILLINOIS

BRAKE

Application filed May 7, 1929. Serial No. 361,191.

My invention relates to the improvements in brakes and more particularly to such types of vehicle brakes which are operable electrically and, therefore, responsive to the electrical conditions of the circuit to which the brakes are connected.

One object of my invention is to provide a brake of improved construction.

Another object of my invention is to provide an electro-responsive brake of efficient design and requiring a minimum amount of electrical energy for its operation.

A further object of my invention is to provide a device of the character described comprising an improved foot-operated control member for use in electrical braking systems.

Still further objects and advantages of my invention will appear as the specification progresses and the novel features thereof will be particularly pointed out in the appended claims.

Figure 1:
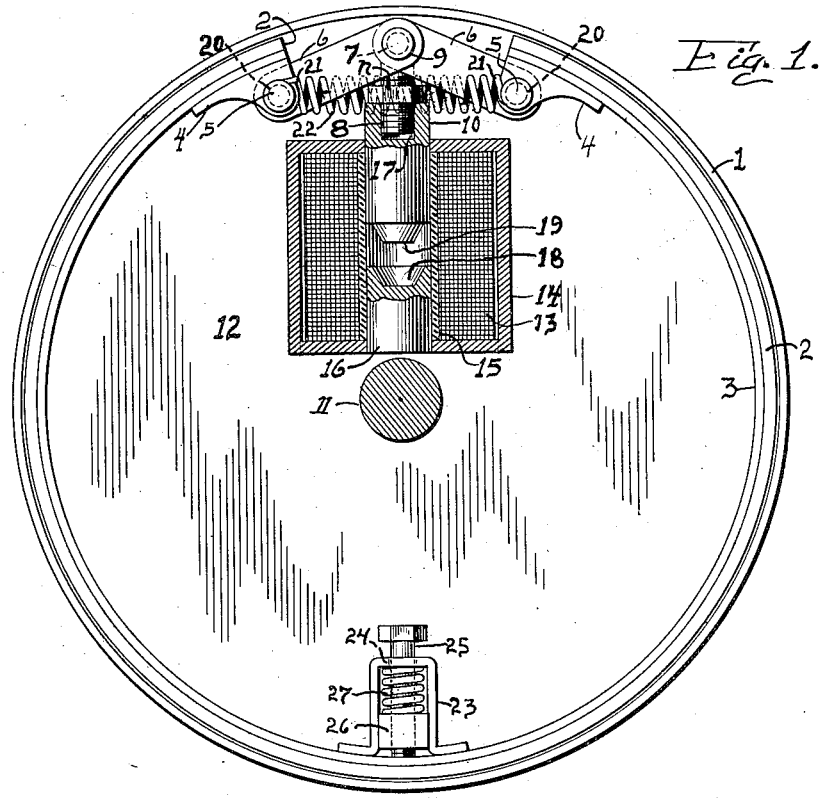
Figure 2:
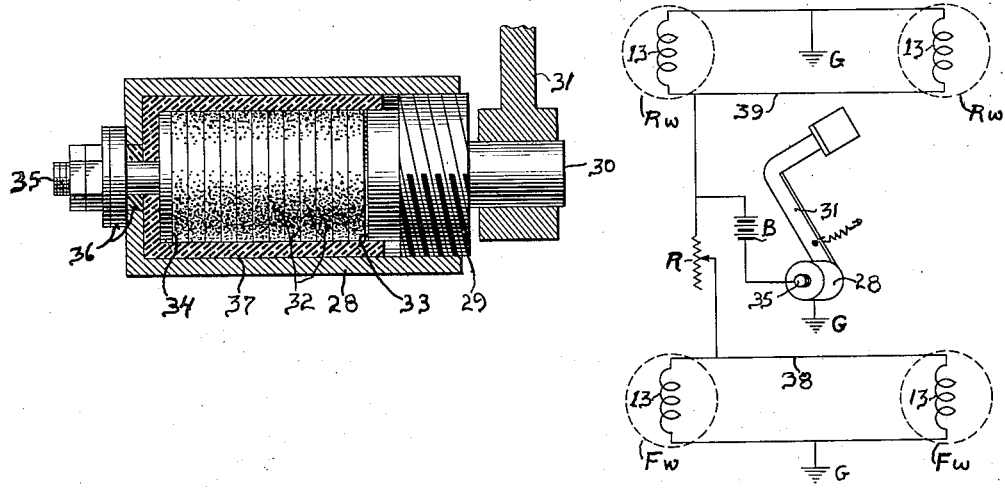
Figure 3:
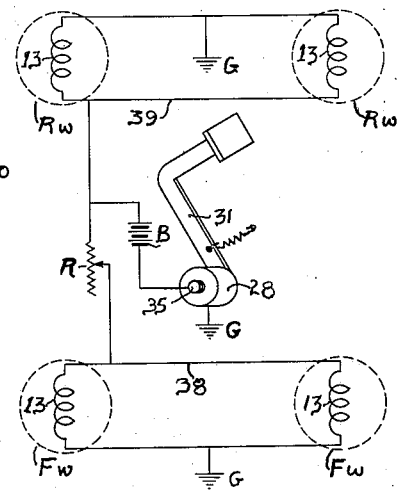
Figure 4:
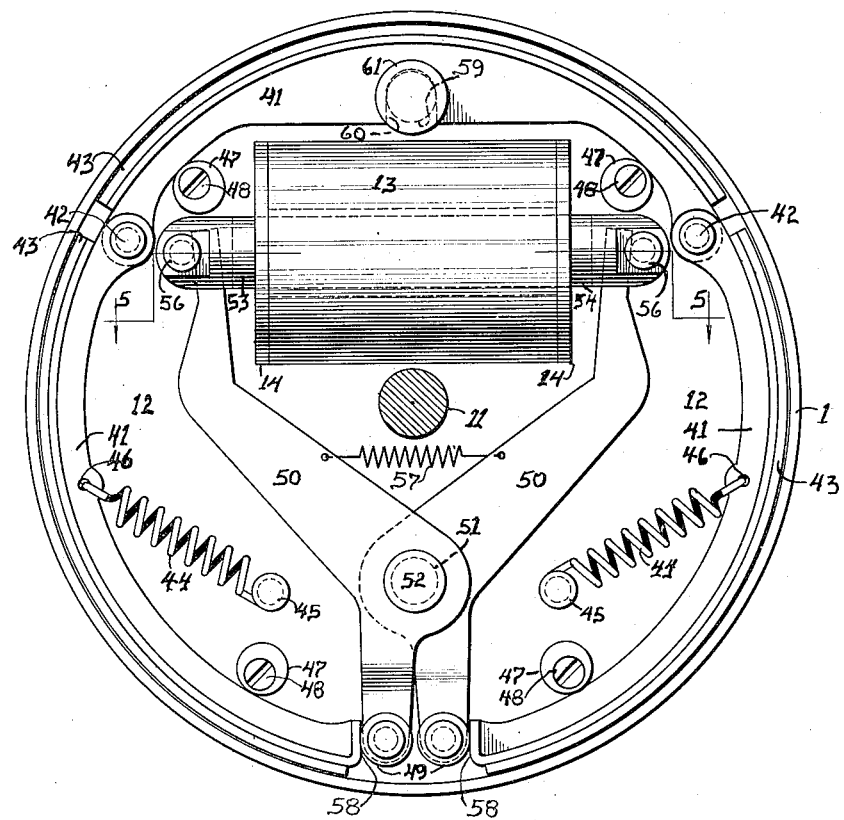
Figure 5:
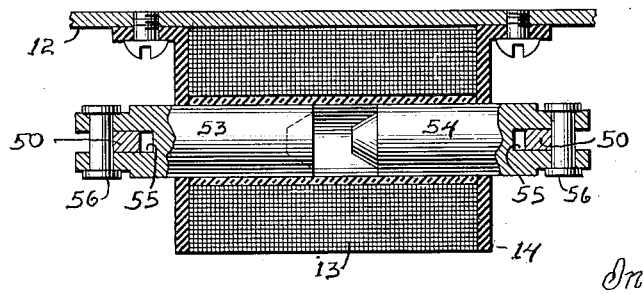

In the drawings Fig. 1 discloses one form of my invention as applied to conventional drum brakes of the internal expanding type. Fig. 2 is a fragmentary section of the pedal, or foot-operated, control member. Fig. 3 is a circuit diagram showing one manner in which the elements may be electrically connected together to carry out my invention. Fig. 4 shows a modification of my invention and Fig. 5 is a section view taken along line 5—5 of Fig. 4.

With particular reference to Fig. 1, the conventional brake drum which rotates with the wheel of the vehicle to which it is applied, is shown at 1. The bottom or disc portion of the drum is not shown, but only the cylindrical portion 1, in order that the interior operating mechanism may be clearly illustrated.

Disposed adjacent to and normally out of contact with the inner cylindrical surface of the drum is a friction band 2 made of suitable material, such as asbestos. Said band or brake lining is fastened to the periphery of an expandable metal shoe 3 by means of rivets (not shown), or in any other suitable manner. Adjacent each end of said shoe and on the inner side thereof is a projecting lug 4 made integrally therewith. Said lugs are provided with transverse holes into which pivots 5 are fastened, the latter serving to pivotally connect the ends of two toggle links 6 with the respective lugs. The remaining ends of the toggle links overlie one another and are pivotally fastened together by means of a pivot member 7.

A screw 8 has the upper portion thereof provided with a transverse hole, or eye, of sufficient diameter to rotatably accommodate the pivot 7. The screw 8, by means of said eye, is supported on the pivot member 7 between the two links 6, and a flattened head portion 9, provided on each end of the pivot 7, serves to retain the parts mounted thereon in close relation axially.

As in ordinary automobile brakes the drum 1 rotates with the wheel and wheel axle 11, the relatively stationary backing plate 12 being fastened to a non-rotating portion of the chassis, such as the axle housing. A solenoid winding 13, encased within a ferromagnetic frame or housing 14, is rigidly fastened by means of said frame to the backing plate 12. The electromagnet coil is wound on a non-ferrous and preferably insulating tube 15, made of bakelite or similar dielectric material.

A stationary soft iron core 16, disposed within the lower end of the tube 15, is fastened to the yoke or frame 14 so that said core cannot move when magnetized. An axially movable solenoid plunger 10, also made of soft iron, is slidably disposed in the upper end of the tube 15. Said plunger is provided with a threaded hole 17 in the upper end thereof, into which hole the screw 8 is secured. Since the plunger 10 can be rotated in the tube 15, its threaded engagement with the screw provides a means of axial adjustment of the plunger relative to said screw. A lock-nut $n$ permits of locking the core against further rotation, once it is adjusted.

The lower end of the solenoid plunger is frusto-conical in shape and the adjacent end of the core 16 is provided with a corresponding tapered cavity 18. Among the objects of this particular construction it is to be noted that due to the small area at the face 19 of the plunger in comparison with its general circular cross section there will be a concentration in the lines of magnetic force at this point, with a resultant increase in attraction between the stationary and the movable core.

It will be manifest from the above description that when the winding 13 is energized its associate plunger will be pulled downwardly thereby spreading apart the extremities of the toggle links 6 which in turn cause a circular expansion of the friction band 2. The frictional engagement of the band against the rotating drum will tend to retard the movement of the latter and this braking action will be entirely dependent upon the amount of current passing through the solenoid coil. The retardation of the vehicle will therefore be dependent upon the voltage applied to the brake coils.

The pins 5, Fig. 1, are sufficiently long to extend a considerable distance beyond both sides of the lugs 4. Adjacent each end of these pins is an annular groove 20 adapted to accommodate the respective ends of tension springs 21 and 22. A portion of the spring 21 is shown cut away to expose the spring 22 mounted to the rear thereof and on the opposite side of the toggle links. The springs 21 and 22, in tending to pull the ends of the brake band together and therefore out of frictional engagement with the drum, also yieldingly oppose the magnetic action of the solenoid through the medium of the toggle joint heretofore explained.

Diametrically opposite the toggle mechanism and fastened to the inner periphery of the member 3 is a U-shaped guide 23 provided with a hole 24 in which the upper unthreaded portion of a bolt 25 is disposed. A block 26, rigidly supported from the back plate 12, has the threaded portion of said bolt screwed therein. Since the member 23 is in a radially slidable contact relative to the block 26, the former permits the brake band to move only in this radial line, but prevents its rotative motion with the drum. A compression spring 27 prevents vibration and dragging of the brake band and assists the springs 21 and 22 in retaining the band in the normal unoperated position shown. The end of the bolt 25 provides an adjustable stop to limit the inward movement of the member 3.

Means for varying the voltage applied to the brake coils is provided in a variable resistor of the carbon disc compression type most clearly shown in Fig. 2 and comprising a metallic cup-shaped casing 28. The open end of said cup is provided with internal threads adapted to engage a multiple-thread plug 29, which plug is made integrally with a pedal supporting shaft 30. The conventional foot-operated brake pedal 31 is fastened to the shaft 30 so that depression of the former will screw the plug 29 into the casing 28, thereby compressing a plurality of carbon or graphite discs 32 between the contacting face 33 of the screw 29 and a metal contact disc 34. A binding post 35, insulated from the casing by fibre washers 36, is used to make electrical connection to the terminal disc 34 and connection with the other end of the carbon pile may be effected by grounding the casing 28 to the frame (see Fig. 3) of the vehicle onto which the casing is fastened. A bakelite or similar cup-shaped lining 37 insulates the edges of the discs from the casing, thereby preventing a direct short circuit of said discs.

In Fig. 3 my invention is shown applied to the four wheels of an automobile or other vehicle. The front wheels are represented by Fw and the rear wheels by Rw. The two coils of the rear wheels are connected to a common conductor 39 and the coils of the front wheels to a common conductor 38, the return circuit from all the coils being through a common ground connection G, which may be the metal chassis of the vehicle. A battery B supplies the necessary voltage and the carbon pile, connected in series therewith, is used to control this voltage. A variable resistor R may be employed to reduce the voltage applied to the front wheels, since in certain instances where 4-wheel brakes are employed it is desirable to make the braking action for the front wheels less than that of the rear wheels. This resistor may be adjusted to the proper value, once and for all times, at the factory.

The conductors leading to the coils may be a flexible copper braid, so as not to interfere with the steering or otherwise resilient supports of the wheels.

Referring now to the modification in Figs. 4 and 5, a similar brake drum 1 is employed, as well as the relatively stationary plate 12. However in this instance 3 brake shoes 41 are employed, being hinged together at points 42 in a well known manner. The shoes are each lined with a suitable brake lining 43 and the latter is normally held out of contact with the drum by means of two springs 44. Posts 45, fastened to the plate 12, serve to fix one end of these springs and the other ends are hooked into holes 46 of the shoes. The inward movement of the three shoes, occasioned by the tension springs 44, is limited by adjustable eccentric stops 47. These stops are rotatable about screws 48, which are held by the backing plate 12, but only when said screws are loosened from said plate sufficiently to permit the adjustment of said eccentrics.

Means for expanding said shoes is provided in rollers 49 pivotally mounted on the lower ends of two levers 50. Said levers are pivoted to the plate 12 by a post 51 provided with a retaining head portion 52. Unlike in Fig. 1, the coil 13 in Figs. 4 and 5 is provided with a core having two movable sections or plungers 53 and 54. The pole faces of the plungers 53 and 54 are shaped like the pole faces of members 18 and 19, respectively.

The uppermost ends of the levers 50 lie slidably in diametrical slots 55 of the plungers and pins 56, transversely disposed through said plungers, serve to retain the levers in the slots, when the solenoid is energized and causes the inward movement of the plungers to move the upper ends of the levers 50 together. This movement spreads the rollers apart, against the action of the springs 44, and operates the brake.

A comparatively small spring 57 keeps the rollers 49 in contact with the surfaces 58 when the magnet is not energized, thus preventing undesirable vibration of the parts.

A post 59, supported from the plate 12, prevents the rotative or dragging motion of the shoes with the drum, but due to the U-shaped slot 60 in the shoe 41, the latter is free to be moved radially. An enlarged head portion 61 retains the shoe at a predetermined height relative to the plate 12.

It will readily occur to those skilled in the art that the shape of the sides of the slot 60 as well as the curvature of the faces 58 may be made such as to assist the braking action of the device, in a well known and obvious manner. It is further manifest, particularly from Fig. 4, that due to the multiplying action of the levers 50, the pressure exerted by the solenoid plungers 53 and 54 is multiplied to a considerable extent when applied to the brake shoes at points 58.

I claim:

1. In a brake, a rotatable drum, a plurality of separate brake shoes frictionally engageable therewith, a solenoid magnet, pressure multiplying means for operating said shoes, and a pair of solenoid plungers for operating said pressure multiplying means.

2. In a brake, a rotatable drum, a plurality of separate brake shoes frictionally engageable therewith, a solenoid magnet, pressure multiplying means for operating said shoes, a pair of solenoid plungers magnetizable by said magnet for operating said pressure multipying means and a foot-operated variable resistor in circuit with said magnet.

3. In a brake, a rotatable drum, a plurality of separate brake shoes frictionally engageable therewith, a solenoid magnet, a pair of pressure multiplying levers, a magnetizable armature for each of said levers, a source of current and a pedal-operated variable resistor for controlling said current.

4. In a brake, a rotatable drum, a plurality of separate mechanically interconnected brake shoes frictionally engageable with said drum, an electromagnet, a plurality of levers, a magnetizable member for each of said levers operable by said electromagnet, means for varying the voltage applied to said electromagnet, said means comprising a plurality of members the overall resistance of which is susceptible to mechanical pressure, and a pedal for variably altering said pressure.

BENJAMIN EARLE MINTURN.